United States Patent Office 3,061,442
Patented Oct. 30, 1962

3,061,442
WHEY COMPOSITION FOR MAKING DOUGH
PRODUCTS
Paul J. Ward, Mount Prospect, John Darold Johnson, Evanston, and Raymond G. Robertson, Arlington Heights, Ill., assignors to National Dairy Products Corporation, New York, N.Y., a corporation of Delaware
No Drawing. Filed Sept. 2, 1959, Ser. No. 837,592
2 Claims. (Cl. 99—91)

The present invention relates generally to an improved whey product and, more particularly, it relates to the use of such an improved whey product in connection with yeast fermented doughs, such as bread.

The use of milk solids in various doughs and batters has been well known and utilized for many years. In this connection, non-fat dry milk solids, and such solids obtained from high heat treated milk, have been used in the preparation of yeast fermented doughs. There are various well known yeast fermented doughs but the one of principal importance is bread dough.

For purposes of this invention, and in the art generally, there is a substantial distinction between yeast fermented doughs, which are primarily leavened by yeast, and cake batters. Such batters, while they may be partially leavened by yeast, are primarily leavened by the use of chemicals. Another dough should be noted and that is biscuit dough, which is leavened substantially only by chemicals. While the product of this invention has various applications in the baking art, it has principal advantage with yeast fermented doughs.

As before indicated, the use of non-fat dry milk solids (NFDMS) in yeast fermented doughs has been widely known for many years. In this connection, these non-fat dry milk solids have been primarily utilized in these doughs to a level of about 6 percent. This use of these milk solids have permitted the use of desired moisture levels and, in this connection, it is generally recognized that one pound of added water may be in the dough for each pound of milk solids used. Furthermore, the milk solids strengthen the physical structure of the dough, or otherwise improve the handling characteristics of the dough. In addition, the milk solids raise the pH of the dough, i.e., make the dough less acid or less sour. The milk solids further act as a buffer in the dough and, thereby give the dough more tolerance to various bakery conditions. The milk solids also give a highly desirable crust color on the finished bread.

Attempts have been made to substitute whey obtained from cheese manufacture for the milk solids in the dough. However, while such whey is rich in various minerals, it does not contain much protein and, when it is used in the dough, the physical structure of the dough is weakened, the pH of the dough is not raised so that it is too acid and there is very limited buffering action so that there is not substantial tolerance of various conditions encountered in bakeries. In the latter connection, the dough does not have as good handleability in mechanical equipment, which is used in many bakeries today. This ability of dough to be handled in mechanical equipment is a highly important requirement for dough.

Because of the limitations upon whey and because whey has not been capable of successful substitution for non-fat dry milk solids, various attempts have been made to modify, fortify or enrich whey so that it could be substituted for the dry milk solids in yeast fermented doughs. While some improvements have been effected by various of these techniques, these improvements have not provided doughs which could be successfully handled in mechanical equipment, could not hold comparable amounts of moisture, did not give the desired buffering effect and, otherwise generally have not been wholly satisfactory substitutes for dry milk solids in the preparation of yeast fermented doughs.

Accordingly, a main object of this invention is the provision of an improved whey product. A more particular object of this invention is the provision of an improved whey product for yeast fermented doughs and the provision of a whey product which can be substituted, pound for pound, in yeast fermented doughs for dry milk solids. A further object of the invention is to provide a whey product capable of holding additional moisture, strengthening the physical structure of dough, providing improved handleability in mechanical equipment and giving the same pH adjustment and control as dry milk solids in the dough, while, at the same time, providing an end product having the desired color.

In accordance with this invention, a product is prepared which comprises whey solids to which are added small amounts of calcium, phosphate, and neutralizing agent so as to provide a whey product having a pH in the range of between about 6.8 and 7.5. The calcium and phosphate ions are added in such amounts as to provide a buffering effect at a pH between about 5.15 and about 5.4. To the whey product is desirably added a hydrophilic agent which will sequester or bind water.

Whey solids can be obtained in the manufacture of various cheeses, such as in the manufacture of American type cheeses and in the manufacture of Swiss type, Parmesan type and cottage type cheeses. In the manufacture of such cheeses, a whey is provided which includes a substantial amount of milk sugar, milk salts, including calcium, sodium, phosphate and potassium ions, along with certain milk proteins, primarily lactalbumin. Depending upon the type of cheese which is being made and the manner of carrying out the make procedure, the whey solids comprise somewhat different amounts of salts and protein. In general, with higher acid cheese make procedures, larger amounts of salts are provided in the whey, whereas with lower acid cheese make procedures, lesser amounts of salts are in the whey. The milk will vary from place to place in the United States, during the year, from season to season, and from plant to plant so that the whey will contain different amounts of salts and milk protein. Furthermore, the wrey solids will vary in pH, the higher acid make procedures providing whey solids with lower pH values and the lower acid make procedures providing higher pH values to the whey solids. The whey from the manufacture of Swiss cheese, which utilizes a lower acid make procedure, is preferred in the practice of this invention, though Cheddar whey, Parmesan whey, cottage cheese whey and other wheys may be used.

In order to provide the desired calcium ion concentration, various edible, harmless calcium salts may be employed and, in this connection, calcium phosphates, calcium chloride, calcium oxide, calcium carbonate, calcium sulphate and calcium lactate may be used. However, most satisfactory results are obtained by the use of calcium chloride which appears to have certain dough tightening characteristics. The desired level of calcium in the product of the invention is between about 1.1 percent and 1.9 percent.

The phosphate ion may be provided from various phosphate compounds, though most satisfactory results have been obtained when the phosphate is provided by means of the calcium compound, i.e. a calcium phosphate compound. The amount of phosphate in the composition of the invention, measured as $P_2O_5$, should be in the range of from about 1.5 to about 2.5 percent.

Since the sodium salts are highly soluble under acidic solutions, it is not necessary to add sodium salts to the product of the invention though the addition of small amounts of sodium salts are not harmful to the product of the invention. In this connection, the amount of sodium which is present in the composition of the invention should be in the range of 0.5 percent to about 0.8 percent.

In the manufacture of the product of the invention, it is not only important to provide salts in the desired amounts but it is also important to add these salts in such amount as to provide a product having a pH in the range of about 6.8 to about 7.5. The amount of salts which will be added will, of course, be in proportion to the acidity of the initial whey, more neutralizing salts being required for higher acid wheys and, of course, less neutralizing salts being required for lower acid wheys. For purposes of neutralizing the whey solids, calcium oxide is a highly desirable material to add as it not only neutralizes but provides a source of calcium ion. However, neutralization may be effected by the use of sodium hydroxide and other well known harmless neutralizing compounds. Since the end product is desirably spray dried, ammonium hydroxide is not desirable.

In the practice of this invention, it is additionally important that the salts be added in such amounts and proportion that the end product will have a buffering effect at a pH in the range from about 5.15 to about 5.4. This appears to be highly important in the manufacture of bread and other fermented dough products.

A still further important requirement of the composition of this invention is the presence of a hydrophilic agent for the purpose of binding moisture in the dough. While various hydrophilic agents may be used in the practice of this invention and while they can be present in varying amounts, the agent should have hydrophilic properties in the pH range of about 5.0 to about 7.5 and should not provide a sticky dough which would interfere with its handleability. A most highly satisfactory hydrophilic agent is sodium caseinate. Other edible hydrophilic agents which may be used but which do not provide quite as good results are carboxy methyl cellulose and moss of the type known as *Eucheuma spinosa*. It has been found that various pregelatinized starches will not provide the desired results. As indicated, the caseinates provide best results and, in this connection, sodium, calcium, potassium and ammonium caseinates may be used. Better results are obtained with increasing amounts of caseinates and the amount of caseinates required is in part a function of the desired moisture in the end dough product. Of course, the amount of caseinates which is added should be limited so as to not make the dough too stiff and, in general, the amount of caseinates added should be in the range of about 1.0 and about 5.0 percent.

While most satisfactory mixing of the materials to provide the compound of the invention is obtained by blending of the ingredients of the composition of the invention prior to addition to the dough, it will be understood that the compounds may be separately added in the preparation of the dough.

In the practice of this invention, the composition provided offers many advantages over the use of whey solids. In this connection, its use permits increased moisture to be added to the dough and gives good structural qualities to the dough so that it may be easily handled, even in mechanical equipment. In addition, the product of this invention increases the initial pH of the dough while, at the same time, providing control of fermentation in fermented doughs, along with pH tolerance. Furthermore, the use of the product of this invention gives a good crust color in a baked dough product.

The above mentioned salts may be added to the whey prior to any concentration or drying, they may be added to concentrated whey, or they may be added to the dried whey. As before noted, the components, including the whey, may be separately added to dough.

In the preparation of a composition of the invention, 95 pounds of Swiss cheese whey was taken and to this was added 1.386 pounds of dicalcium phosphate $$(CaHP_4 \cdot 2H_2O)$$

0.925 pound of calcium chloride ($CaCl_2 \cdot 2H_2O$); 0.764 pound of calcium oxide (CaO) and 2.000 pounds of sodium caseinate. The materials were blended in a ribbon blender for ten minutes so as to assure uniform mixing of the chemicals throughout the product. The resulting product has a pH of about 7.2 and was buffered at a pH of about 5.23.

The resulting product was made into bread in a conventional way.

In this connection, a sponge was prepared by placing 337 cc. of water in a bowl and to the water was added 525 grams of flour. In addition, 18.75 grams of bakers yeast and 1.87 grams of yeast food were added. The yeast food comprised:

25 percent calcium sulfate
10 percent ammonium chloride
.3 percent potassium bromate
25 percent sodium chloride
40 percent flour A mix was prepared, to which the sponge was added, the mix including the following:

213 cc. water
225 grams flour
30 grams sucrose
22.5 grams shortening
15 grams sodium chloride
30 grams whey with added materials After the sponge and mix were combined, the dough was baked and the resulting bread compared to a bread in which the non-fat milk solids were substituted for the composition of this invention, the resulting breads each had a volume of about 2675 cc. indicating that comparable results were obtained with the composition of this invention.

In another composition of this invention, ammonium caseinate was substituted for the sodium caseinate and the composition made into bread. When this composition was used in bread, the results were comparable to those obtained with the use of dry milk solids.

In a third example of this invention, carboxy methyl cellulose in the amount of 3 percent of the weight of the flour was substituted for the sodium caseinate in the first example and the end product was made into bread. The resultant bread had comparable volume of 2660 cc.

In another example, disodium phosphate was substituted for the dicalcium phosphate, and the resulting composition had the desired pH and buffering capacity and was made into bread in accordance with the foregoing procedure. The bread had a volume comparable to that obtained when dry milk solids were used.

In still another example of the preparation of the composition of the invention, to 5000 pounds of Swiss whey was added 1.4 pounds of dicalcium phosphate (duohydrate form), 0.9 pound of calcium chloride (anhydrous), 0.8 pound of calcium oxide and 2.0 pounds of sodium caseinate. The product was concentrated and spray dried in accordance with conventional procedures to provide the composition of this invention. This product was baked into bread and provided a loaf having volume which corresponds to the volume when dried milk solids were used with the same moisture.

As still another example of this invention, Swiss cheese whey was concentrated to a solids concentration of about 20 percent and to 479 pounds of this concentrate was added 1.4 pounds of dicalcium phosphate (duohydrate form), 0.9 pound of anhydrous calcium chloride, 0.8 pound of calcium oxide and 2.0 pounds of sodium caseinate. This product was spray dried, in a conventional manner, and made into bread in accordance with the above formula.

Many variations of the components of this formula may be made, as illustrated in the foregoing and which will be apparent to those skilled in the art but, it is believed that those skilled in the art can make these variations. Accordingly, these variations are within the scope of the claims hereinafter set forth.

We claim:
1. A composition for making dough products comprising, in combination, whey solids caseinates in an amount of more than about 1.0 percent and less than about 5.0 percent, and calcium, sodium and phosphorous compounds at levels such that the composition comprises calcium in an amount of more than about 1.1 percent and less than about 1.9 percent, sodium in an amount of more than about .5 percent and less than about .8 percent, $P_2O_5$ in an amount of more than about 1.5 percent and less than about 2.5 percent, the composition having a pH in excess of about 6.8 but less than about 7.5, the said compounds being present in such amount that the composition is buffered at a pH between about 5.15 and about 5.4.

2. A composition for making dough products comprising, in combination, Swiss cheese whey solids caseinates in an amount of more than about 1.0 percent and less than about 5.0 percent, and calcium, sodium, and phosphorous compounds at levels such that the composition comprises, calcium in an amount of more than about 1.1 percent and less than about 1.9 percent, sodium in an amount of more than about .5 percent and less than about .8 percent, $P_2O_5$ in an amount of more than about 1.5 percent and less than about 2.5 percent, the composition having a pH in excess of about 6.8 but less than about 7.5, the said compounds being present in such amount that the composition is buffered at a pH between about 5.15 and about 5.4.

References Cited in the file of this patent

UNITED STATES PATENTS

| | | |
|---|---|---|
| 2,336,634 | Peebles | Dec. 14, 1943 |
| 2,555,514 | Sharp et al. | June 5, 1951 |
| 2,602,746 | Meade | July 8, 1952 |
| 2,602,747 | Meade | July 8, 1952 |
| 2,736,654 | Selman et al. | Feb. 28, 1956 |

OTHER REFERENCES

Federal Register, August 8, 1950, p. 5103.

"Baking Science and Technology," vol. I, 1952, by Pyler, Siebel Pub. Co. (Chicago), pp. 327, 328.

UNITED STATES PATENT OFFICE
CERTIFICATE OF CORRECTION

Patent No. 3,061,442            October 30, 1962

Paul J. Ward et al.

It is hereby certified that error appears in the above numbered patent requiring correction and that the said Letters Patent should read as corrected below.

Column 5, lines 11 and 25, after "solids", each occurrenc insert a comma.

Signed and sealed this 27th day of October 1964.

(SEAL)
Attest:

ERNEST W. SWIDER
Attesting Officer

EDWARD J. BRENNER
Commissioner of Patents